Nov. 1, 1932.    H. C. FREY    1,886,041
CURB PIPE
Filed Feb. 27, 1931    2 Sheets-Sheet 1

Howard C. Frey
INVENTOR
BY
ATTORNEY

Nov. 1, 1932.   H. C. FREY   1,886,041
CURB PIPE
Filed Feb. 27, 1931   2 Sheets-Sheet 2
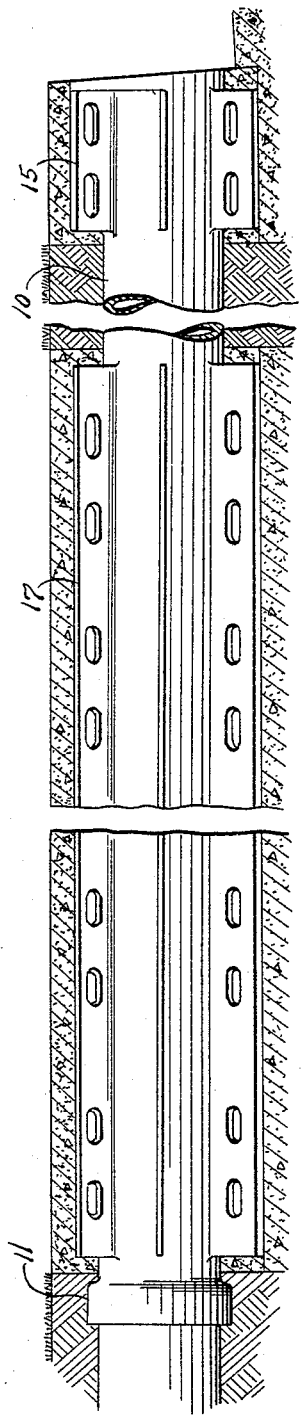
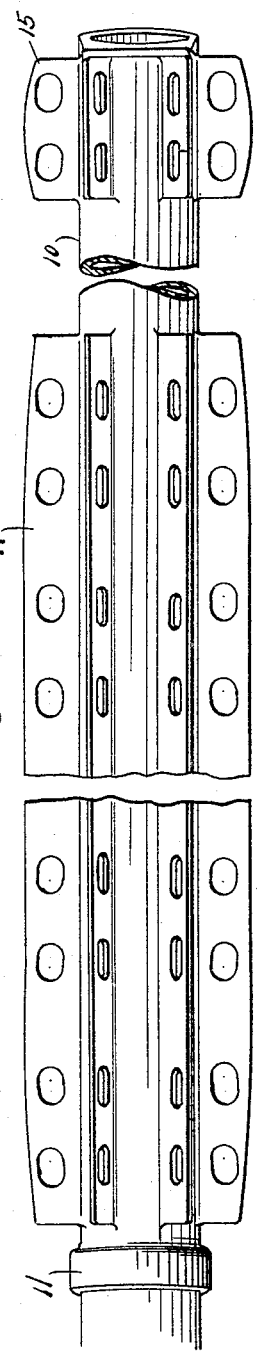
Howard C. Frey INVENTOR
BY
ATTORNEY Patented Nov. 1, 1932

1,886,041

UNITED STATES PATENT OFFICE

HOWARD C. FREY, OF MAPLEWOOD, NEW JERSEY

CURB PIPE

Application filed February 27, 1931. Serial No. 518,838.

This invention relates to certain new and useful improvements in sewer drain or culvert pipe construction and embodies, among other characteristics, supporting elements of a nature designed to prevent turning or independent distortion of the pipe sections after same have been connected.

An additional object of the invention consists in the arrangement of passages within the supporting elements for the accommodation of mortar, cement or the like whereby the pipes may be held suspended beneath sidewalks, curbs and the like although the ground beneath the pipes may have settled to an appreciable extent.

More specifically stated the supporting elements may be tapered longitudinally thereof in oppositely disposed relation to that of the longitudinal center of the pipe whereby the supporting elements may dispose the outer edges thereof parallel to the exposed surface of the sidewalk or curb and yet permit disposing of the pipe at a desired pitch to facilitate drainage.

With the above and other objects in view, the invention further consists of the following novel features and details of construction, to be hereinafter more fully described, illustrated in the accompanying drawings and pointed out in the appended claims.

In the drawings:

Figure 6 is a fragmentary side elevation of a modified form of the invention combining in one piece the curb and sidewalk pipes.

Figure 7 is a fragmentary top plan view of the Figure 6 modification.

Figure 1:
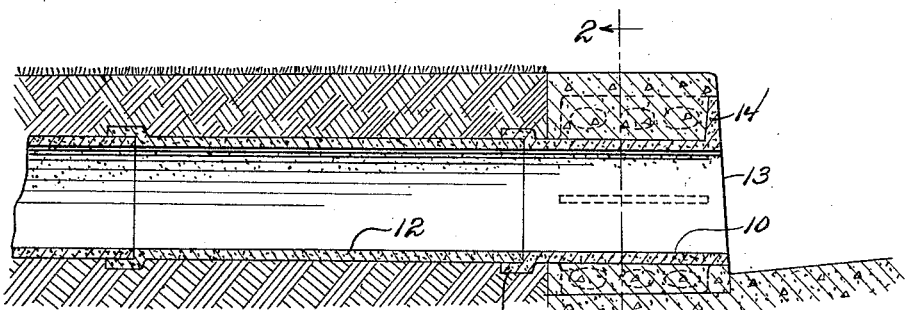
Figure 1 is a longitudinal sectional view taken through the present invention and illustrative of the particular relationship of the supporting elements with the curb and pipe.
Figure 2:
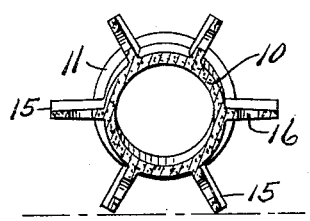
Figure 2 is a sectional view taken on line 2—2 of Figure 1.
Figure 3:
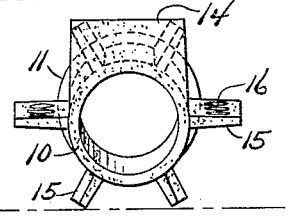
Figure 3 is an end elevation of the form of pipe used at the curb.
Figure 4:
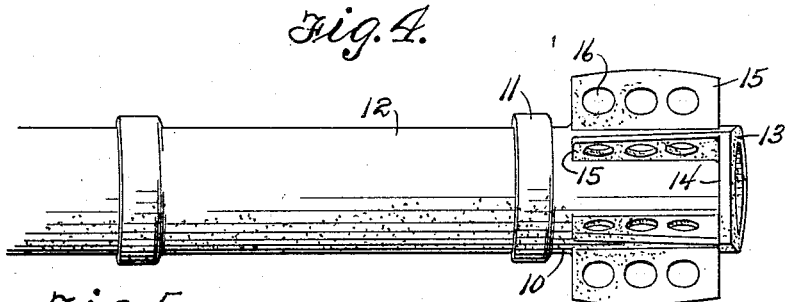
Figure 4 is a top plan view of the curb type of pipe.
Figure 5:
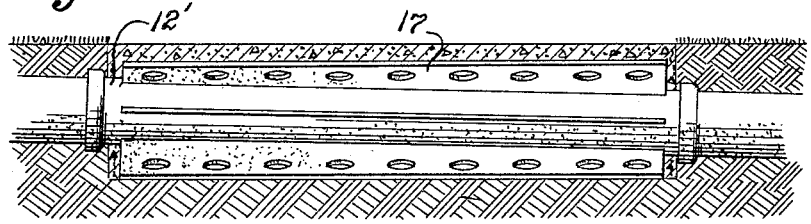
Figure 5 is a side elevation of a form of pipe to be utilized beneath sidewalks.

Referring to the drawings in detail wherein like characters of reference denote corresponding parts, the reference character 10 indicates generally a form of pipe capable of being used for culverts, sewers and the like but in the present instance, for purposes of illustration only, same is shown and will be described as a drain pipe for carrying off surface drainage from dwellings to the gutters in the streets. Said pipes may be of cast-iron, terra cotta or the like and provided with bells 11 to fascilitate accommodation of the reduced ends 12 of complemental pipes in the usual manner. As understood from the illustrations of the invention in Figures 1 and 4 of the drawings, the outermost or discharge end of the curb form of pipe 10 is on a bias in conformity to the shoulder portion or rise of the curb from the bottom of the gutter, as indicated at 13. A plate member 14, carried by the pipe and extended upwardly therefrom in alignment with that of the aforementioned extremity and the outer surface of the curb, will hold back quantities of the cement, motar or other plastic compositions used to cement the pipe in place at the time the curb is molded. Supporting elements 15, carried by and laterally extending from the spaced outer surface of the pipe and falling short of extending the entire width of the curb construction, are apertured, as at 16, to facilitates accommodation of appropriate portions of cement or other plastic composition to maintain said pipe against displacement even though the earth beneath the pipe may have settled or fallen away from the under surface of the pipe to an appreciable extent. The supporting elements 15 may be of any size and number, straight, inclined or pitched, in accordance with the particular design and proportions of the curb construction.

In instances of the above character where sidewalks are arranged in close proximity to the curbs, the next succeeding length or section of pipe, and as indicated at 12, is provided with elongated spaced laterally extending supporting elements 17 arranged after the manner of the supporting members 15 upon the outer surface of the pipe. The outer side edges of the supporting elements or fins 17 are inclined in different directions upon opposite sides of the pipe and each instance out of parallelism with the median center of the pipe section 12 whereby said tapered edges may be arranged parallel to the outer surface of the sidewalk and yet the pipe 12 may be arranged at a pitch or angle to permit drainage. The supporting elements or fins 17 are also provided with passages or openings extended transversely therethrough within and through which suitable quantities of the cement may be forced or purged during the construction of the sidewalk whereby the pipe section 12 may be held against displacement by the sidewalk incident to the settlement of earth beneath the under surface of the pipe.

The plate 14, carried upon the outermost or discharge end of the curb pipe 10, will prevent the gutter construction from cracking or chipping and materially strengthen the connections of the supporting elements or fins 15. The particular angle, inclination or angle of bias assumed by the outermost or discharge end of the pipe 10 when arranged parallel and in alignment with the outer surface of the curb will fix or predetermine the angularity of the entire chain or assemblage of pipes for drainage purposes.

The modification of the invention disclosed in Figures 6 and 7 of the drawings embodies the characteristics set forth for the form of invention described and illustrated in Figures 1 to 5 inclusive but differentiates therefrom in that the outer edges of the fins 17 therefor are not tapered longitudinally thereof but are disposed throughout the major portions of their lengths in parallelism to the median center of the immediate pipe and as suggested in Figure 7 of the drawings, the ends of said fins are slightly curved whereby the corners or edges of the cement used in the composition of the curb or sidewalk will not be chipped off.

Although I have shown and described the present invention as having special application upon sidewalks, sewers and the like, it is obviously apparent that the invention may be employed to advantage in other instances, too numerous to mention, without departing from the spirit of the invention.

The invention is susceptible of various changes in its form, proportions and minor details of construction and the right is herein reserved to make such changes as properly fall within the scope of the appended claims.

Having described the invention, what is claimed is:

1. A drain pipe construction for use beneath sidewalks and curbs having a plurality of spaced laterally extending reinforcing elements arranged at intervals upon the outer surface thereof, and each of said elements having passages within and through which portions of the sidewalk and curb composition may be forced.

2. A drain pipe construction for use at curbs and positioned with relation thereto during the formation thereof comprising a plurality of equally spaced laterally extending supporting elements outstanding from the pipe adjacent the curb, and said supporting elements each having a plurality of passages extending transversely therethrough to accommodate portions of the curb composition to retain the pipe against displacement.

3. A drain pipe construction for use at curbs and positioned with relation thereto during the formation thereof comprising a plurality of angularly disposed supporting elements outstanding from the pipe adjacent the curb, said supporting elements and each having passages extending transversely therethrough to accommodate portions of the curb composition to retain the pipe against displacement, and a plate carried by said pipe at the discharge end thereof projecting in a plane with the adjacent surface of the curb to fix the pitch of the pipe.

4. A drain pipe construction for use at sidewalks and positioned with relation thereto during the formation thereof comprising a plurality of spaced supporting elements outstanding from the pipe, said supporting elements having the outer edges inclined in oppositely disposed relation to that of the median center of the pipe to dispose said edges in parallelism to the upper surface of the sidewalk and locating of the pipe at a suitable drainage pitch, and each of said supporting elements having passages extending transversely therethrough for the accommodation of portions of the sidewalk composition to retain the pipe against displacement.

In testimony whereof I affix my signature.

HOWARD C. FREY.